United States Patent
VandenHeuvel et al.

(10) Patent No.: US 7,823,949 B2
(45) Date of Patent: Nov. 2, 2010

(54) LATCH SYSTEM FOR SLIDING PANEL IN VEHICLE

(75) Inventors: Joel E. VandenHeuvel, Zeeland, MI (US); Paul L. Gossett, Hudsonville, MI (US); Randy William Nurenberg, Hudsonville, MI (US); Jerry J. Luchies, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 562 days.

(21) Appl. No.: 11/788,434

(22) Filed: Apr. 19, 2007

(65) Prior Publication Data

US 2007/0246960 A1  Oct. 25, 2007

Related U.S. Application Data

(60) Provisional application No. 60/793,598, filed on Apr. 20, 2006.

(51) Int. Cl.
*B60R 7/04* (2006.01)

(52) U.S. Cl. .................. 296/37.8; 296/24.34; 296/1.08

(58) Field of Classification Search ................ 296/37.8, 296/1.08, 24.34, 98, 70, 146.7, 37.12, 37.9, 296/37.15, 37.16; 220/345.3, 345.2, 350; 206/816; 312/297; 160/201; 224/539
See application file for complete search history.

(56) References Cited

U.S. PATENT DOCUMENTS

| 4,128,120 | A | 12/1978 | Frey |
| 4,854,632 | A * | 8/1989 | Kreuze et al. ............ 296/37.12 |
| 5,372,175 | A | 12/1994 | Calhoun |
| 6,742,563 | B2 | 6/2004 | Belanger |
| 6,883,852 | B2 | 4/2005 | Laskey |
| 7,540,391 | B2 * | 6/2009 | Kato .......................... 220/252 |
| 7,581,773 | B2 * | 9/2009 | Strasser et al. ............. 296/1.09 |

* cited by examiner

*Primary Examiner*—Joseph D Pape
(74) *Attorney, Agent, or Firm*—Foley & Lardner LLP

(57) ABSTRACT

A vehicle trim component is disclosed. The vehicle trim component includes a base with a track. A panel movable between a first position and a second position and having at least one guide member at its lateral edge that engages the track as the panel is moved between the first position and the second position. A latch system including a catch and a biasing member. The guide member engages the catch when the panel is in the first position.

19 Claims, 5 Drawing Sheets

LATCH SYSTEM FOR SLIDING PANEL IN VEHICLE

CROSS-REFERENCE TO RELATED PATENT APPLICATIONS

This application claims priority from U.S. Provisional Application No. 60/793,598, filed Apr. 20, 2006, incorporated herein by reference in its entirety.

BACKGROUND

This disclosure relates to a latch system, and more particularly a latch system for a panel such as a sliding panel in a vehicle.

It is known to provide for sliding panels, for example doors such as a tambour door, in vehicles used to cover storage enclosures. Such known sliding doors typically have a detent or a latch to retain the door in a desired position. However, such known latch systems occupy space in the vehicle, do not provide sufficient amount of latching or retaining force, and do not otherwise realize certain advantageous features (and/or combinations of features).

It would be desirable to provide a sliding panel, door or the like of a type that includes any one or more of these or other advantageous features: provide a panel that can be articulated to expose or cover a storage space, controls, a display, a user interface, a mirror, or the like; provide a latch system for an articulated panel that can be secured in a closed position; provide a latch system that maximizes storage or functional options and arrangements by not requiring additional bulkhead or structural members between its lateral edges; provide a latch system that provides a positive engagement between the panel and the base; and meet Federal Motor Vehicle Standards Specification 201 (FMVSS 201) and reasonable release efforts to slide the panel.

SUMMARY

According to an exemplary embodiment, a vehicle trim component includes a base which includes a track. A panel is movable between a first position and a second position has at least one guide member at its lateral edge that engages the track as the panel is moved between the first position and the second position. A latch system includes a catch and a biasing member. The guide member engages the catch when the panel is in the first position.

According to another exemplary embodiment, a vehicle console includes a housing structure having side walls and defining an opening. A track coupled to the housing structure is proximate the opening. A panel is movable between a first position and a second position has at least one guide member at its lateral edge that slidably engages the track as the panel is moved between the first position and the second position. A latch system includes a catch and a biasing member, wherein the guide member engages the catch when the panel is in the first position.

According to a further exemplary embodiment, a vehicle trim component includes a base which includes a track. A panel is movable between a first position and a second position has at least one guide member at its lateral edge that slidably engages the track as the panel is moved between the first position and the second position. A latch system disposed at the lateral edge of the panel to latch the panel in the first position.

The vehicle trim component further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments.

DESCRIPTION

Figure 1:
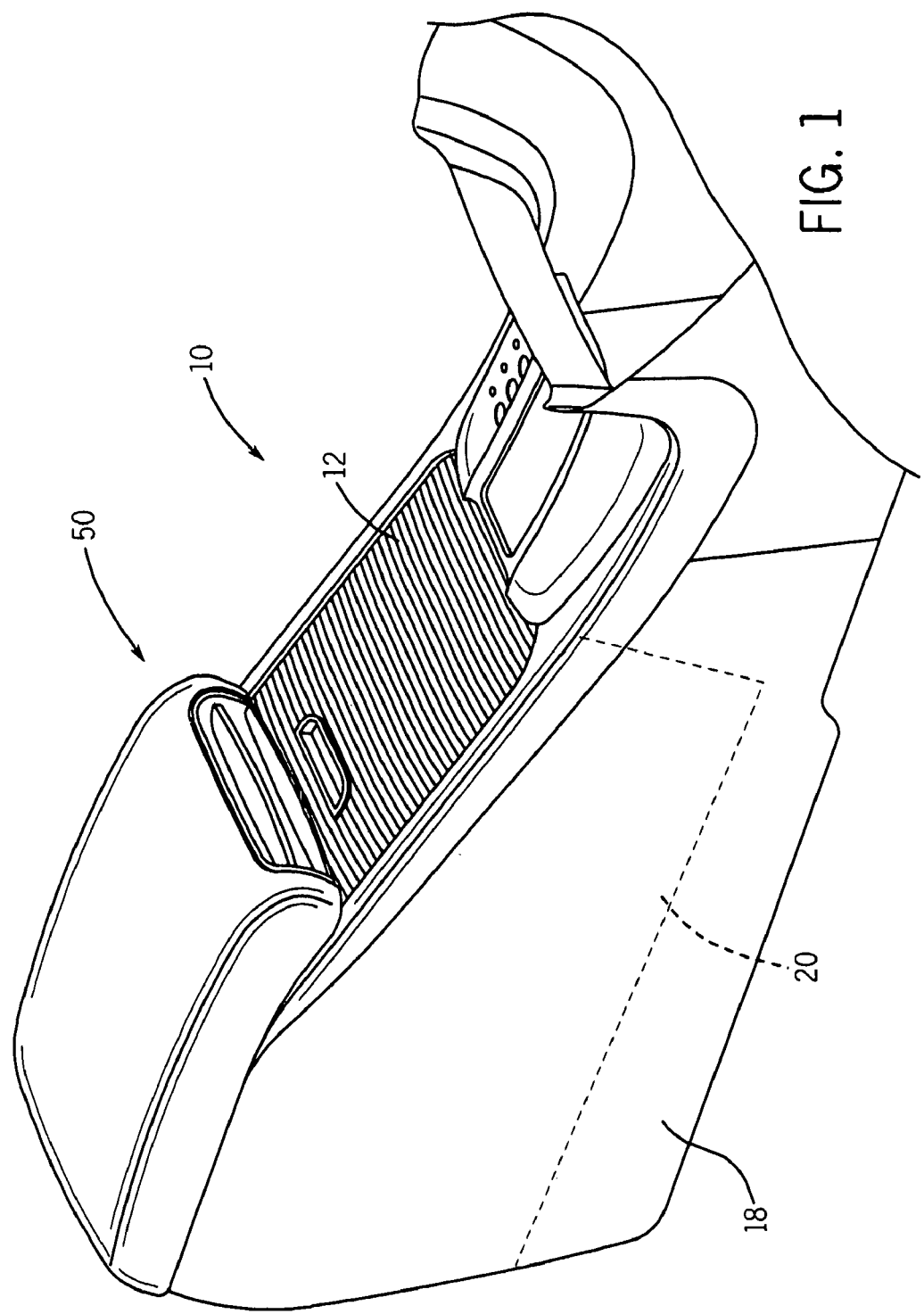
FIG. 1 is a perspective view of a base configured as a vehicle console with an articulating panel in the form of a sliding panel.
Figure 2:
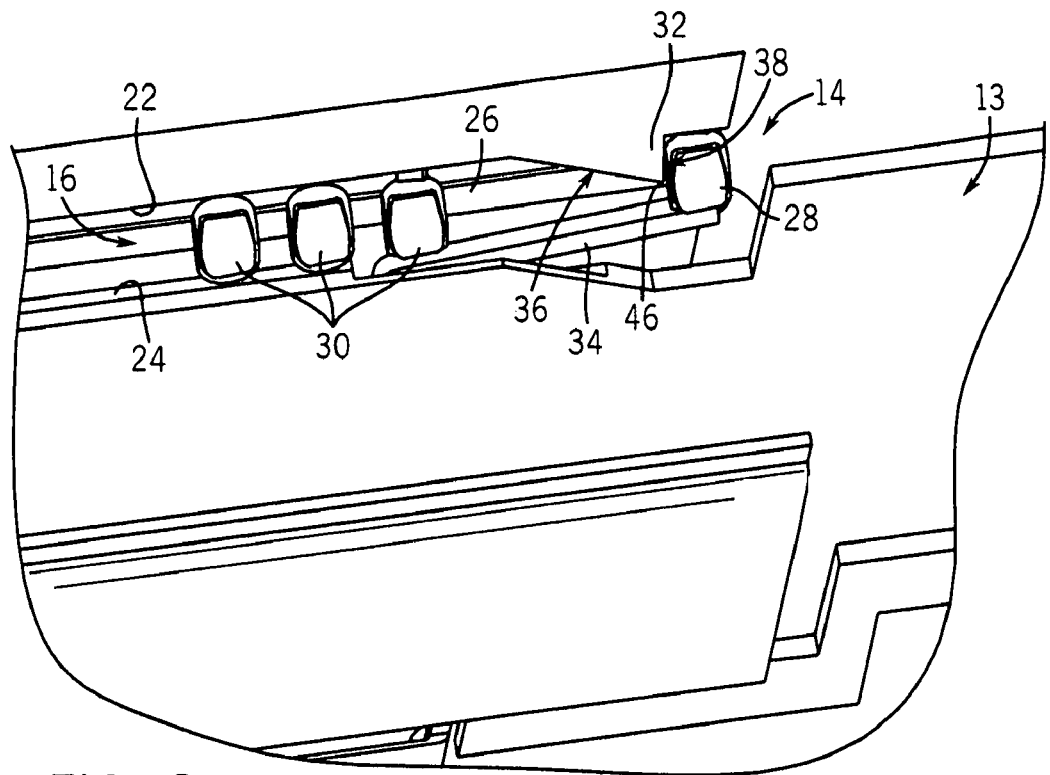
FIGS. 2-5 are fragmentary side perspective views of the base, panel, and latch system.
Figure 3:
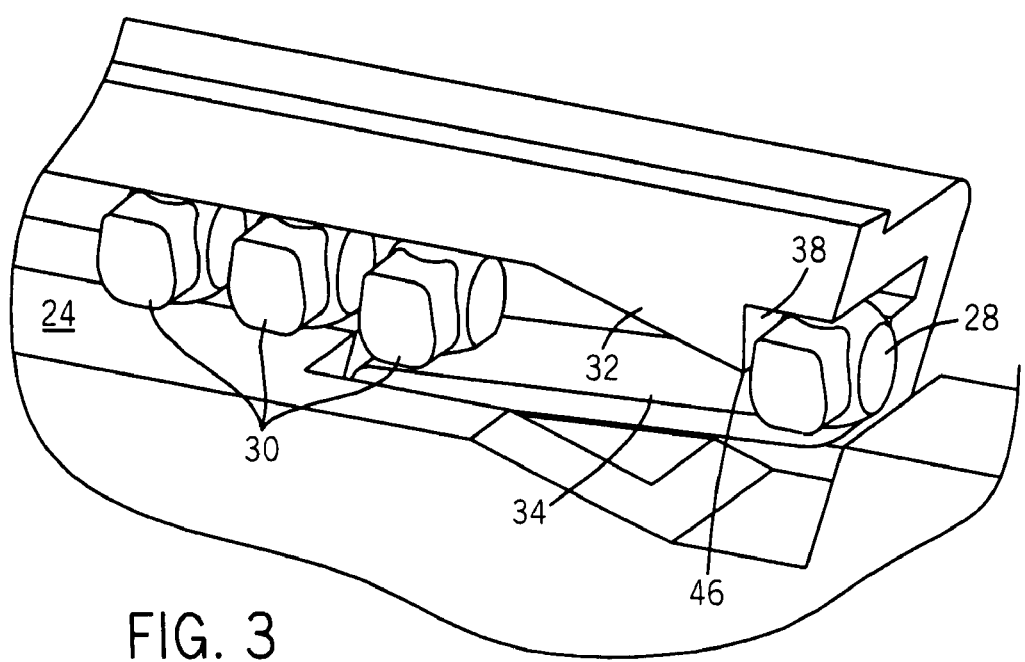
Figure 4:
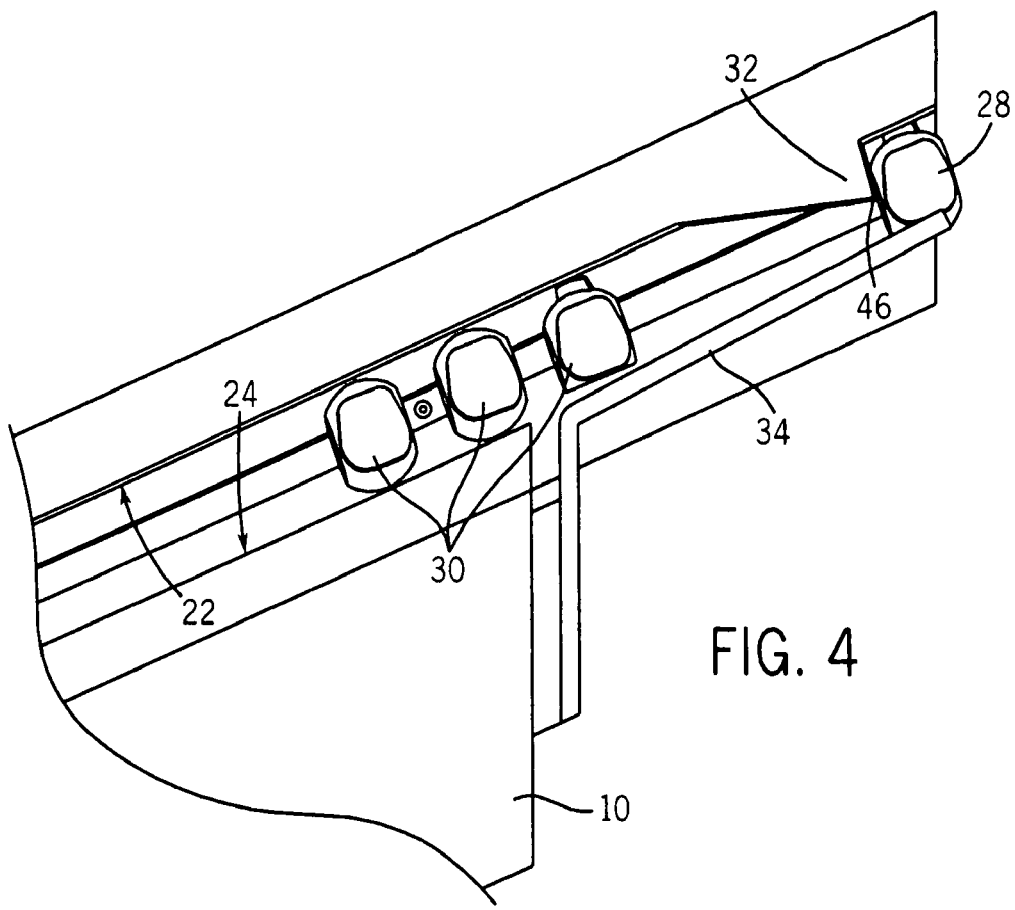
Figure 5:
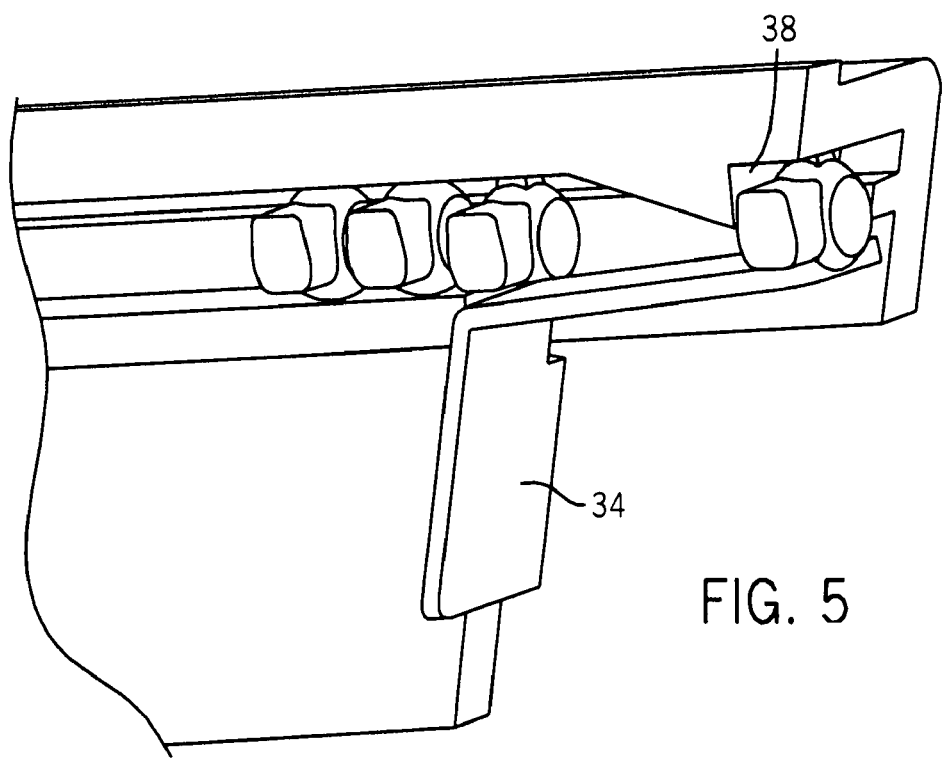
Figure 6:
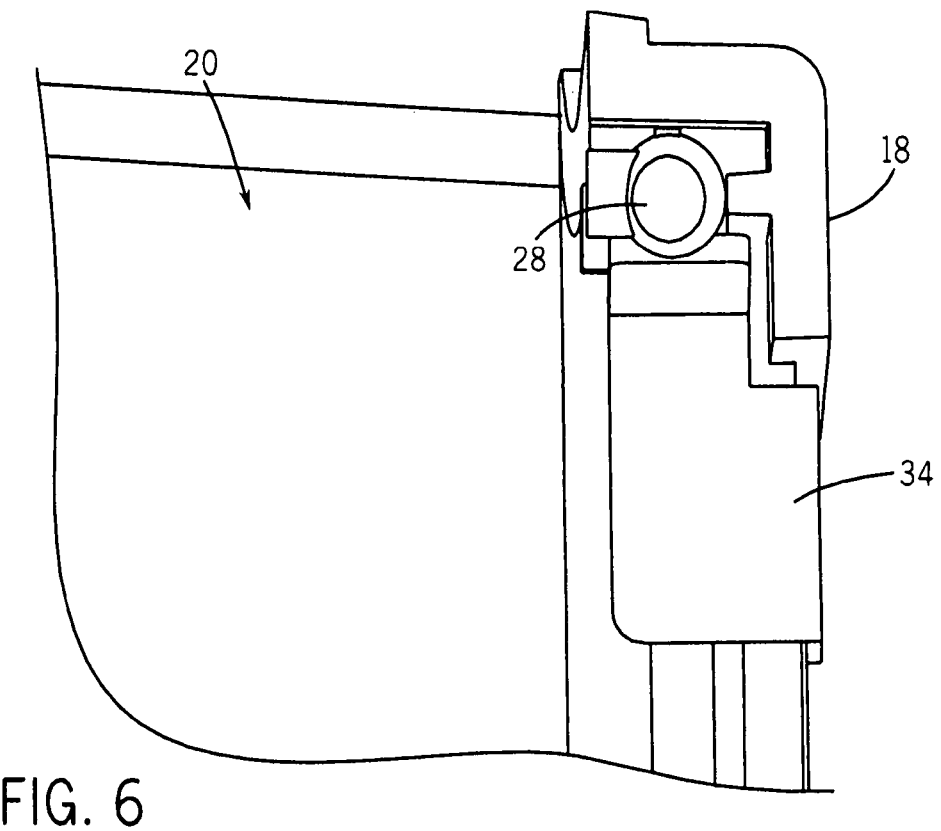
FIG. 6 is a fragmentary front perspective view of the base, panel, and latch system.
Figure 7:
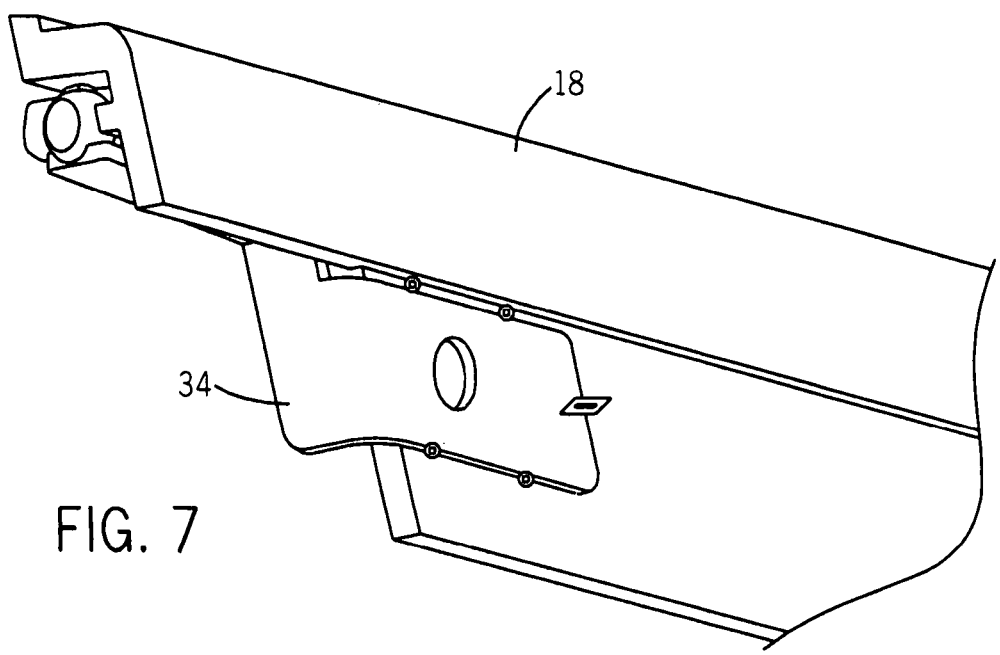
FIG. 7 is a fragmentary side perspective view of the base, panel, and latch system.

FIGS. 1 and 2 illustrate a base 10 and a panel 12 coupled to the base 10 by a latch system 14. The base 10 can be configured to be mounted in a vehicle interior and, in the illustrated exemplary embodiment, is a console 50 for a vehicle (not shown). Console 50 typically is coupled to a vehicle floor between two seats. According to an exemplary embodiment, console 50 is configured to provide a storage area and an arm rest for an occupant of one or both seats. Console 50 is a generally prismatic structure with a front wall, a rear wall, two opposed and generally symmetrical side walls and a top surface. Console 50 includes two side panels 18 and a rear panel. Side panels 18 each provide a side wall of console 50 and a portion of the rear wall, the front wall and the top surface. Rear panel provides a portion of the rear wall and the top surface. Console 50 also includes a bin 20, an inner partition or insert, tracks, and an opening 13. The door panel 12 is configured to close the opening 13 in console 50.

Opening 13 provided in console 50 may be selectively closed with the door panel 12. The door panel 12 can be a flexible or articulated door. According to an exemplary embodiment, panel 12 is a tambour door and rides on tracks or rails 16. Tracks 16 may be coupled to panels 18 or integrally formed with panels 18. An insert (e.g., interior, partition, bin, liner etc.) may be provided within console 50 that is selectively accessible through opening 13.

As will be understood from FIGS. 3-7, the track 16 is configured to receive a portion of the panel 12 to provide support and an engagement for the panel 12. The track 16 includes a first (e.g., upper) surface 22 and a second (e.g., lower) surface 24. A projection 26 (e.g., rib, etc.) extends from an inner surface of track 16 and is configured to provide alignment of the panel 12 and reduce the side to side movement of the panel 12.

The panel 12 engages the track 16 of the console 50 and is coupled or retained in place, at times, by the latch system 14. The panel 12 comprises a front support or guide member 28 and one or more subsequent support or guides members 30. According to an exemplary embodiment, the panel 12 is shown as a "tambour" door having a plurality of segments connected by a web (i.e., a "living hinge"). The guide members are sometimes referred to as balls or beads with tambour door applications. One or more of the segments may include ends that form the lateral sides (boundary, edge, etc.) of the panel 12 and comprise the support or guide member(s). At least the forward most guide member 28 is configured to engage the latch system 14.

The latch system 14 includes a catch 32 and a biasing member 34 and is configured to minimize structure needed to retain the panel in a closed position.

The catch 32 is configured to retain the panel 12 in a desired position and to require a predetermined minimum level or amount of force to unlatch the panel. The catch 32 includes a ramped surface 36 and a retaining surface 38. According to an exemplary embodiment, the retaining surface 38 is at an acute or right angle relative to the upper surface 22 and at an acute angle relative to the ramped surface 36. According to alternative embodiments, the retaining surface 38 may be at any of a variety of angles to provide the desired retaining performance. According to a preferred embodiment, the catch 32 is integrally molded with at least a portion of the console 50 (e.g., as a one piece, unitary component) such as with the track 16. According to an alternative embodiment, the catch 32 is a separate component that is attached to the console 50 and/or track 16.

The biasing member 34 is configured to bias an engagement portion of the panel 12 against the ramped surface 36 and into engagement with the retaining surface 38. According to an exemplary embodiment, the biasing member 34 is a spring (e.g., a leaf spring as shown in FIG. 3-7) coupled to one of the console 50 and the track 16. According to an alternative embodiment, the biasing member 34 is integrally formed with the console 50 or the track 16 as a one-piece, unitary component. Alternatively, any of a variety of resilient members may be used to bias the panel 12 into engagement and securement with the catch 32.

Figure 8:
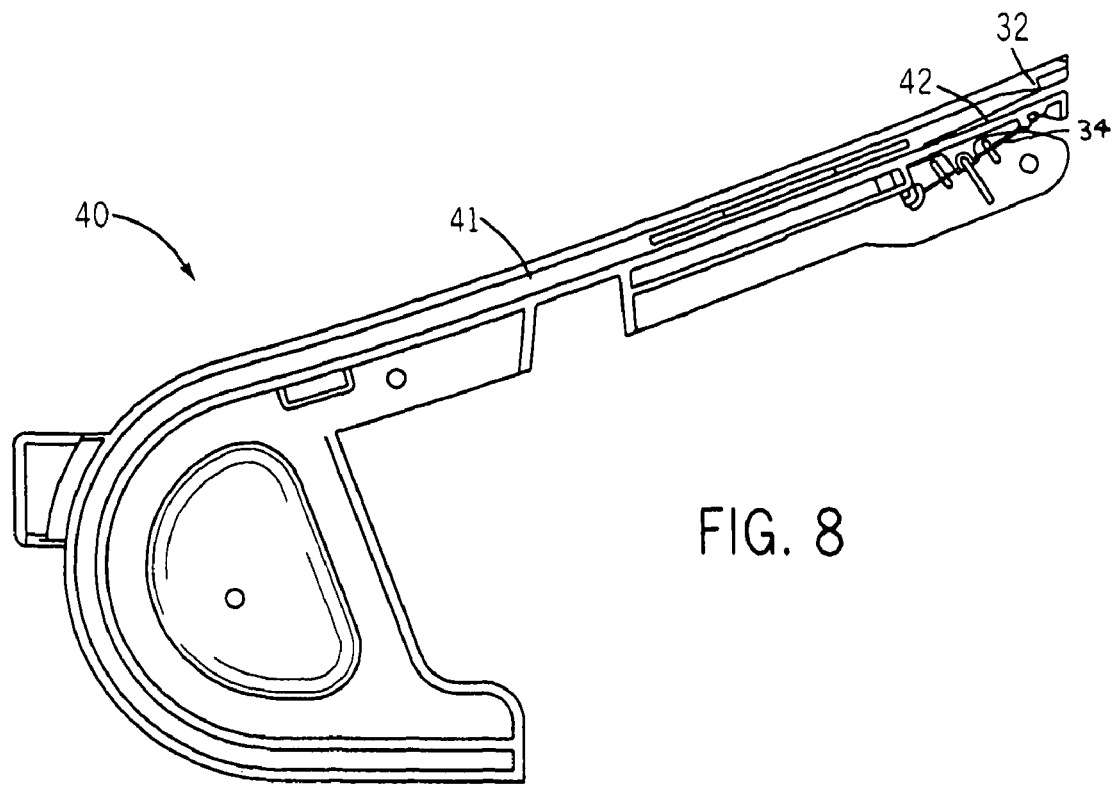
FIGS. 8 and 9 are views of a track according to an exemplary embodiment.
Figure 9:
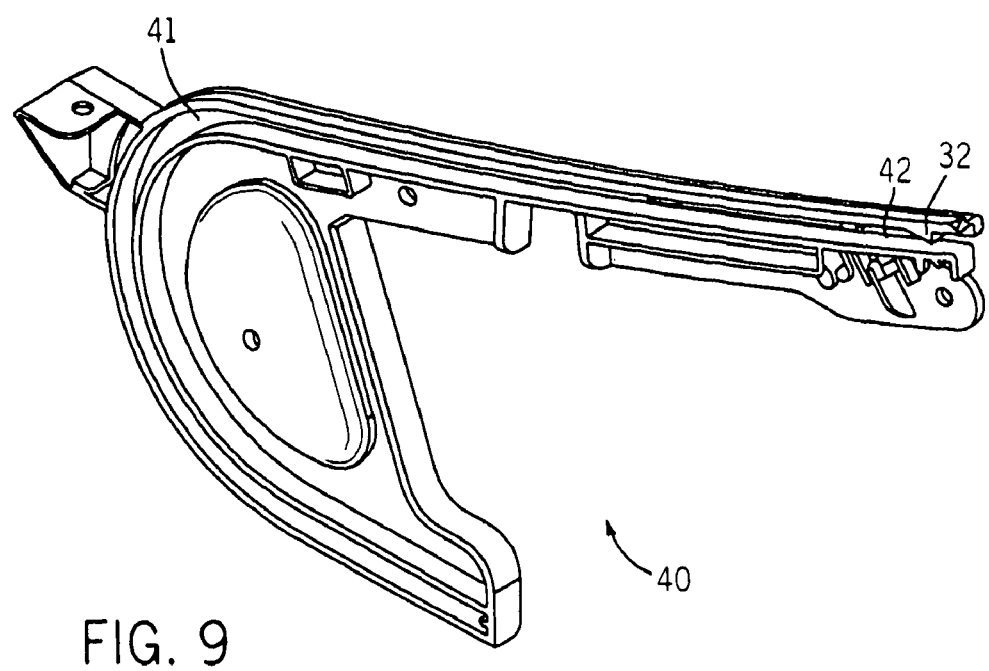

Referring to FIG. 8, a track component 40 is shown according to an exemplary embodiment. The track component 40 comprises a track 41, a flexible member or beam 42 such that the biasing force is provided by beam 42, and a biasing member 34, such as a wire spring (or a leaf spring, etc.) located below, and in supporting contact with, the beam 42. As such, the resistance against the guide member 28 moving along the ramp surface 36 is provided by an upward force generated by the resilient nature of the beam 42 and (e.g., mostly) by the spring 34.

The panel 12 is movable between a first position and a second position. In the first or "closed" position, the panel 12 inhibits access (physical and/or visual) (e.g., covers, conceals, protects, screens, obscures, masks, etc.) to at least a portion of the console 50. In the second or "open" position, the panel 12 allows access (physical and/or visual) (e.g., uncovers, exposes, reveals, discloses, etc.) to at least a portion of the console 50. For example, the panel 12 in the open position allows access to a bin 20 which can be used for a storage area, a cup holder, a vehicle control, a display, user interface items, or a combination of same. According to a preferred embodiment, the panel 12 is configured for translating or sliding movement. When in the second position, the panel 12 may be coiled or wrapped to minimize space it occupies.

To secure or latch the panel 12, the panel 12 is moved or slid along track 16 until front guide member 28 encounters the ramp surface 36. Additional force is then required to continue sliding the panel 12 along ramped surface 36 to overcome the upward force generated by biasing member 34. Once front guide member 28 passes the end or edge 46 of the catch 32, the biasing member 34 pushes or snaps the member 28 into place and the panel 12 is latched or retained in place by the retaining surface 38.

To open the panel 12, the user pushes (downward) against and flexes the panel 12 to overcome the force generated by the biasing member 34 so that the guide member 28 clears the edge 46 of the catch 32 (i.e., "unlatch"). The panel 12 can then be slid towards the first or open position. According to a preferred embodiment, the front guide member 28 is spaced apart from the subsequent guide members 30 so that the panel 12 can flex sufficiently, with a desired amount of force by the user, to clear the catch 32.

The guide members 28, 30 may be configured (e.g., shaped, sized, contoured, etc.) to provide the desired sliding and latching performance. Also, the angle of the ramp surface 36 relative to the track 16 may be any of a variety of angles depending on the desired amount of force to engage the latch.

The base 10 is shown in the illustrated embodiment as a center console 50, mounted between a pair of seats, but the base 10 may be any of a variety of structures, including an instrument panel, a door, an overhead system or headliner, trim panels, vehicle trim components or panels, or the like.

The particular materials used to construct the exemplary embodiments are also illustrative. For example, injection molded high density polyethylene is one method and material for making the panel 12, and injection molded thermoplastic elastomer is another method and material for making the panel 12. However, other materials can be used, including other thermoplastic resins such as polypropylene, other polyethylenes, acrylonitrile butadiene styrene ("ABS"), polyurethane nylon, any of a variety of homopolymer plastics, copolymer plastics, plastics with special additives, filled plastics, etc. Also, other molding operations may be used to form these components, such as blow molding, rotational molding, etc. Components of the base 10 and panel 12 can also be manufactured from stamped alloy materials such as steel or aluminum.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature Although a number of exemplary and alternative embodiments have been described in detail, it is to be understood that the trim component is not limited to the details of construction and the arrangement of the components set forth in the forgoing description or illustrated in the drawings. It is also to be understood that the phraseology and terminology employed herein is for the purpose of description and should not be regarded as limiting. For example, while the components of the disclosed embodiments will be illustrated as a panel designed for a vehicle interior, the features of the disclosed embodiments have a much wider applicability. For example, the latch design is adaptable for other storage units, bins, containers, and other office, home, or educational products which employ a storage space configured to have a panel that is moveable to inhibit visual and physical access to it. Further, the size of the various components and the size of the containers can be widely varied. Also, it is important to note that the terms "base," "panel," and "latch" are intended to be broad terms and not terms of limitation. These components may be used with any of a variety of products or arrangements and are not intended to be limited to use with vehicle interior applications.

It is also important to note that the construction and arrangement of the elements of the latch system as shown in the exemplary embodiments is illustrative only. Although only a few embodiments of the vehicle trim component have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connectors or other elements of the system may be varied, and the nature or number of adjustment positions provided between the elements may be varied (e.g. by variations in the number of engagement slots or size of the engagement slots or type of engagement). It should be noted that the elements and/or assemblies of the system may be constructed from any of a wide variety of materials that provide sufficient strength or durability, in any of a wide variety of colors, textures and combinations. Accordingly, all such modifications are intended to be included. Other substitutions, modifications, changes and omissions may be made in the design, operating conditions and arrangement of the exemplary embodiments.

What is claimed is:

1. A vehicle trim component comprising:
   a base comprising a track;
   a panel movable between a first position and a second position and having at least one guide member at its lateral edge that engages the track as the panel is moved between the first position and the second position; and
   a latch system comprising a catch and a biasing member;
   wherein the guide member engages the catch when the panel is in the first position.

2. The vehicle trim component of claim 1 wherein the first position is a closed position and the second position is an open position.

3. The vehicle trim component of claim 2 wherein the open position allows access to a bin defined in the base.

4. The vehicle trim component of claim 1 wherein the catch comprises a ramped surface that the guide member slides along between the second position and the first position and a retaining surface, wherein the biasing member inhibits the guide member from moving from the first position to the second position.

5. The vehicle trim component of claim 4 wherein the biasing member comprises a spring.

6. The vehicle trim component of claim 4 wherein the base comprises a flexible beam.

7. The vehicle trim component of claim 1 wherein the panel is a tambour door.

8. The vehicle trim component of claim 1 wherein the latch system is contained within the track and the track is coupled to a side panel of the base.

9. The vehicle trim component of claim 1 wherein the base is configured to be used with a vehicle console system.

10. A vehicle console comprising:
    a housing structure including side walls and defining an opening;
    a track coupled to the housing structure proximate the opening;
    a panel movable between a first position and a second position and having at least one guide member at its lateral edge that engages the track as the panel is moved between the first position and the second position; and
    a latch system comprising a catch and a biasing member;
    wherein the guide member engages the catch when the panel is in the first position.

11. The vehicle console of claim 10 wherein the first position is a closed position and the second position is an open position.

12. The vehicle console of claim 11 wherein the open position allows access to a bin defined in the housing structure.

13. The vehicle console of claim 10 wherein the catch comprises a ramped surface that the guide member slides along between the second position to the first position and a retaining surface, wherein the biasing member inhibits the guide member from moving from the first position to the second position.

14. The vehicle console of claim 13 wherein the biasing member comprises a spring.

15. The vehicle console of claim 14 wherein the base comprises a flexible beam.

16. The vehicle console of claim 10 wherein the panel is a door.

17. The vehicle console of claim 16 wherein the door is a tambour door.

18. The vehicle console of claim 10 wherein the latch system is contained within the track and the track is coupled to the side wall of the housing structure.

19. The vehicle console of claim 10 wherein the console is configured to positioned between a pair of vehicle seats.

* * * * *